(12) United States Patent
Sachs et al.

(10) Patent No.: US 9,187,012 B2
(45) Date of Patent: Nov. 17, 2015

(54) PIVOTING AND RECLINING VEHICLE SEATING ASSEMBLY

(71) Applicant: Ford Global Technologies, LLC, Dearborn, MI (US)

(72) Inventors: Adam Sachs, Oak Park, MI (US); Johnathan Andrew Line, Northville, MI (US); Gunnar Groesbeck, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/104,680

(22) Filed: Dec. 12, 2013

(65) Prior Publication Data
US 2015/0165935 A1 Jun. 18, 2015

(51) Int. Cl.
*B60N 2/22* (2006.01)
*B60N 2/18* (2006.01)

(52) U.S. Cl.
CPC ........ *B60N 2/22* (2013.01); *B60N 2/181* (2013.01); *B60N 2/1846* (2013.01); *B60N 2/1853* (2013.01); *B60N 2/2209* (2013.01); *B60N 2/2222* (2013.01)

(58) Field of Classification Search
CPC .... B60N 2/181; B60N 2/1846; B60N 2/1853; B60N 2/2209; B60N 2/2222
USPC .......... 297/256.13, 321, 330, 342; 296/65.08, 296/65.09
See application file for complete search history.

(56) References Cited

U.S. PATENT DOCUMENTS

| | | | | | |
|---|---|---|---|---|---|
| 2,272,505 | A | * | 2/1942 | Biggs | 297/335 |
| 2,725,921 | A | * | 12/1955 | Markin | 297/216.15 |
| 3,880,462 | A | * | 4/1975 | Mednick | 297/84 |
| 4,058,342 | A | * | 11/1977 | Ettridge | 297/256.13 |
| 4,205,877 | A | * | 6/1980 | Ettridge | 297/321 |
| 4,518,201 | A | * | 5/1985 | Wahlmann et al. | 297/316 |
| 4,609,221 | A | | 9/1986 | Bottcher | |
| 4,616,874 | A | * | 10/1986 | Pietsch et al. | 297/321 |
| 5,112,018 | A | | 5/1992 | Wahls | |
| 5,145,232 | A | | 9/1992 | Dal Monte | |
| 5,203,608 | A | | 4/1993 | Tame | |
| 5,868,450 | A | | 2/1999 | Hashimoto | |
| 5,979,985 | A | | 11/1999 | Bauer et al. | |
| 7,140,682 | B2 | | 11/2006 | Jaeger et al. | |

(Continued)

FOREIGN PATENT DOCUMENTS

| EP | 0627339 | 12/1994 |
|---|---|---|
| EP | 0594526 B1 | 3/1997 |
| EP | 2565070 | 3/2013 |

(Continued)

OTHER PUBLICATIONS

General Motors LLC. "2013 Chevrolet Spark Owner Manual," copyright 2012, 356 pages.

*Primary Examiner* — Peter Brown
(74) *Attorney, Agent, or Firm* — Vichit Chea; Price Heneveld LLP

(57) ABSTRACT

A vehicle seating assembly includes a seatback and a seat base pivotally coupled with the seatback. An upper link is pivotally coupled between an upper portion of the seatback and a rear support. A front link and a rear link are pivotally coupled between the seat base and a floor. A bottom end of the front link is moveable on the floor between a forward position and a rearward position, adjusting the seatback respectively between a reclined position and an upright position.

20 Claims, 8 Drawing Sheets

(56) References Cited

U.S. PATENT DOCUMENTS 7,216,915 B2 * 5/2007 Kammerer et al. ........ 296/65.09
2010/0259081 A1 10/2010 Kuno

FOREIGN PATENT DOCUMENTS

| JP | 2008189176 | 8/2008 |
|----|------------|--------|
| JP | 2011098588 | 5/2011 |

* cited by examiner

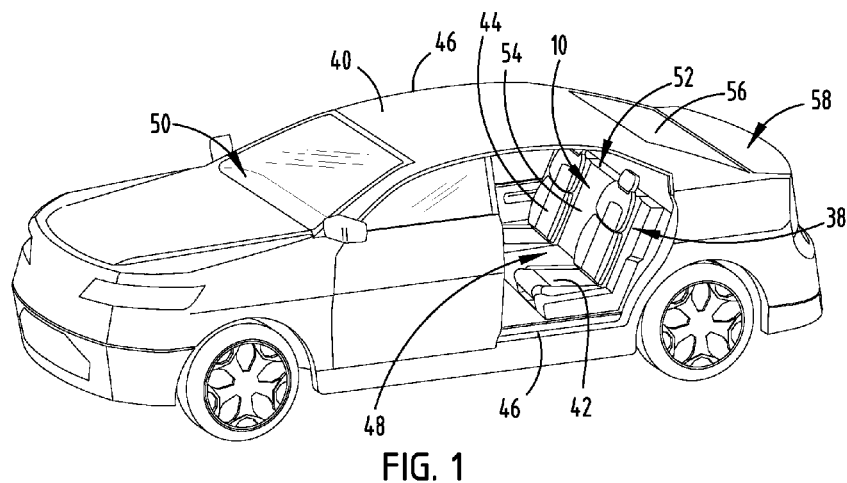
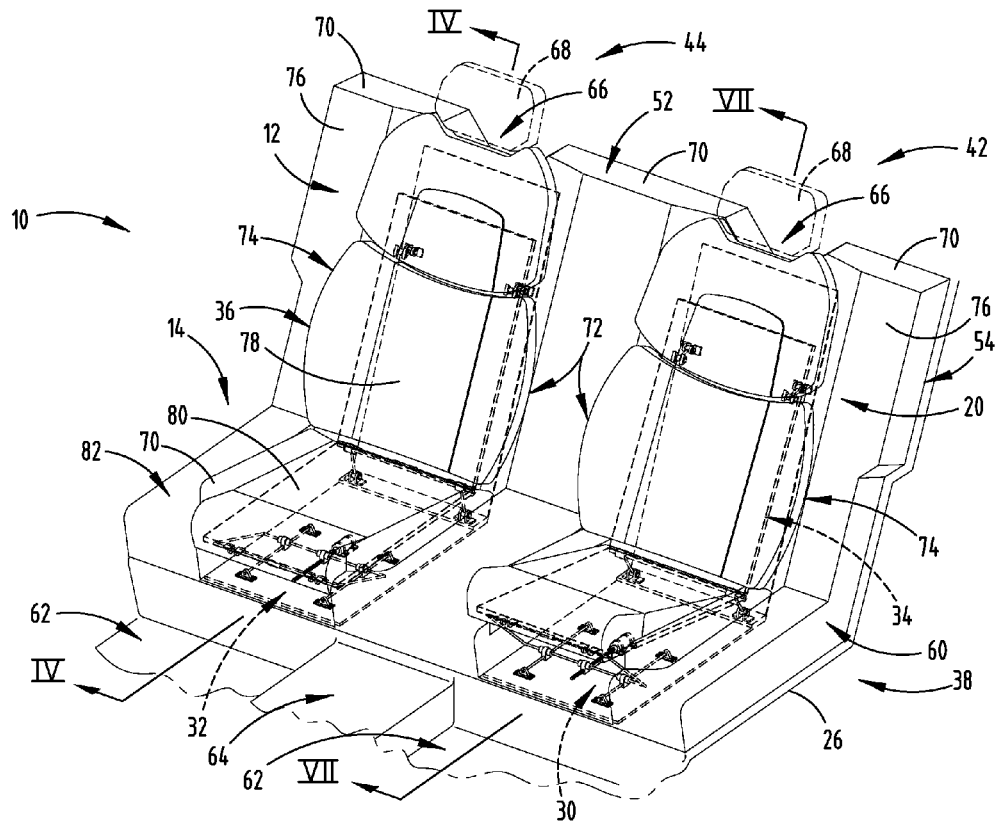

PIVOTING AND RECLINING VEHICLE SEATING ASSEMBLY

FIELD OF THE INVENTION

The present invention generally relates to a vehicle seating assembly, and more particularly to a reclining seat assembly for a rear row of vehicle seating.

BACKGROUND OF THE INVENTION

It is relatively common for vehicle seating assemblies, especially those located in the front driver and front passenger seating locations, to have a seatback that reclines for adjusting the occupant's sitting position. However, upon reclining such a vehicle seating assembly rearward, the seatback may constrict that area of the vehicle behind the seating assembly. Accordingly, rear vehicle seating assemblies typically lack the capability to recline. As vehicle sizes generally continue to reduce, vehicle seating assemblies are increasingly being adapted with features aimed at increasing vehicle storage capacity, improving rear seat accessibility, and generally reducing the overall volume of vehicle seating assemblies, while also attempting to improve occupant comfort and offer additional seating adjustments.

SUMMARY OF THE INVENTION

According to one aspect of the present invention, a vehicle seating assembly includes a seatback and a seat base pivotally coupled with the seatback. An upper link is coupled between an upper portion of the seatback and a rear support. Front and rear links are coupled between the seat base and a floor. A bottom end of the front link is movable on the floor between forward and rearward positions, adjusting the seatback respectively between reclined and upright positions.

According to another aspect of the present invention, a vehicle seating assembly includes a seatback and a seat base. A coupling is between the seatback and a rear support for guiding the seatback between reclined and upright positions. Front and rear links are pivotally coupled between the seat base and a floor. A bottom end of the front link is operably coupled with a slide assembly and movable thereon between forward and rearward positions to adjust the seatback respectively between the reclined and upright positions.

According to yet another aspect of the present invention, a vehicle seating assembly includes a seatback pivotally coupled with a seat base. A first movable connection is between the seatback and a rear support. A second movable connection is between a rear point on the seat base and a floor. A front link is pivotally coupled between the seat base and a slide assembly that longitudinally moves the front link over the floor, adjusting the seatback between reclined and upright positions.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 1 is a top perspective view of a pair of vehicle seating assemblies configured together in a rear bench seating arrangement in a vehicle, according to one embodiment of the present invention;

FIG. 2 is a front top perspective view of the pair of vehicle seating assemblies;

DETAILED DESCRIPTION OF THE PREFERRED EMBODIMENTS

Figure 3:
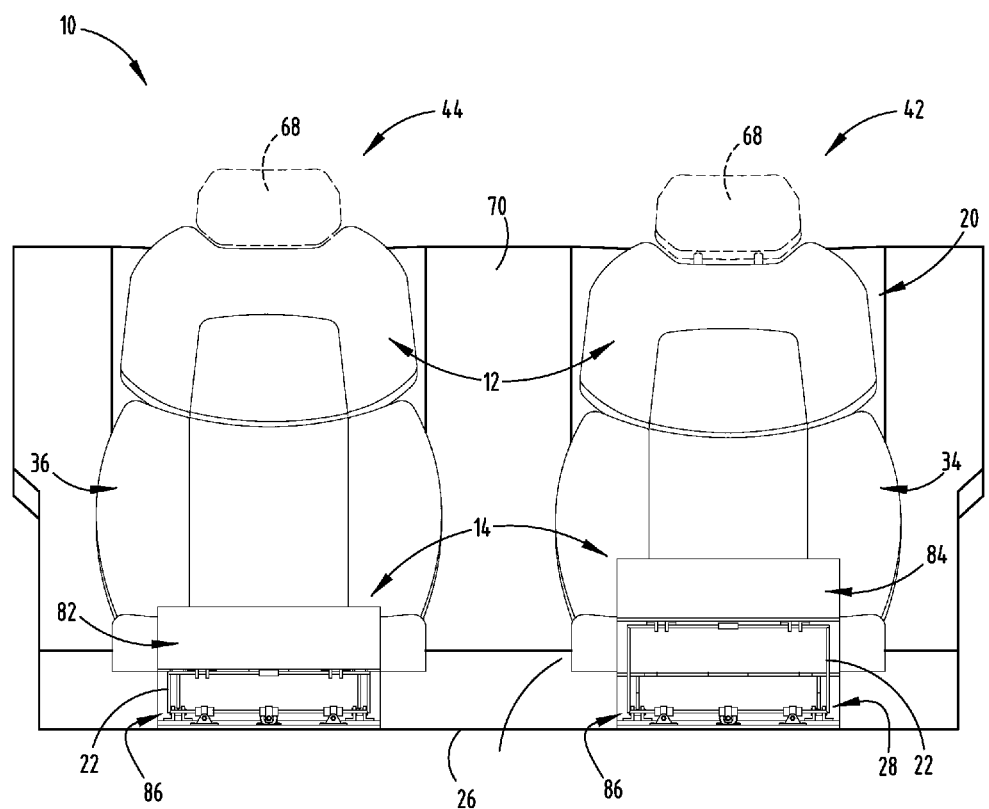
FIG. 3 is a front elevational view of the pair of vehicle seating assemblies.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-9B, reference numeral 10 generally designates a vehicle seating assembly that includes a seatback 12 and a seat base 14 pivotally coupled with the seatback 12. An upper link 16 is pivotally coupled between an upper portion 18 of the seatback 12 and a rear support 20. A front link 22 and a rear link 24 are pivotally coupled between the seat base 14 and a floor 26. A bottom end 28 of the front link 22 is moveable on the floor 26 between a forward position 30 and a rearward position 32, adjusting the seatback 12 respectively between a reclined position 34 and an upright position 36.

Referring now to FIG. 1, one embodiment of the vehicle seating assembly 10 is shown positioned in a rear row 38 of seating on the driver's side location of a vehicle 40. More specifically, in this embodiment, a first vehicle seating assembly 42 is configured adjacent to an additional second vehicle seating assembly 44 in a rear bench-style seating arrangement, which spans laterally from a side door opening 46 on the passenger's side of the vehicle 40 across the width of the vehicle 40 to a side door opening 46 on the driver's side of the vehicle 40. An interior compartment 48 of the vehicle 40 is defined laterally between the side door openings 46 of the vehicle 40 and longitudinally generally between a front wall 50, including the fire wall and further defined by the dashboard and instrument panel, and a back wall 52 of the vehicle 40, including a quarter structure 54 that extends upward from the floor 26 of the vehicle 40 to an area proximate a rear window 56. The back wall 52, in the illustrated embodiment, also defines a division in the vehicle 40 between the interior compartment 48 and a rear storage compartment 58 of the vehicle 40. It is contemplated that the back wall 52 that supports the seatback 12 of the vehicle seating assembly 10 may also be a rigid support structure that does not act to divide compartments of the vehicle in additional embodiments of the vehicle seating assembly 10 and the vehicle 40. Accordingly, in additional embodiments, the seating assembly 10 may be positioned in various other vehicle types, including vans, trucks, cars, station wagons, and sport utility vehicles that may or may not have the rear storage compartment 58 rearward from the back wall 52. It is understood that the vehicle seating assembly 10 may be positioned at various locations throughout the vehicle 40 other than the illustrated position, such as a mid-row location, a front row location, or other contemplated locations within a vehicle. It is also conceivable that the vehicle seating assembly 10 may be altered in lateral width to accommodate additional occupants or vehicle seating assemblies laterally within the vehicle 40 and may also be altered on other conceivable dimensions of the vehicle seating assembly 10 to accommodate a larger or smaller portion of the interior compartment 48 of the vehicle 40.

As illustrated in FIG. 2, the back wall 52 is shown spanning continuously behind the adjacent first and second vehicle seating assemblies 42, 44, which together form the rear row 38 of seating. It is understood that the back wall 52 may be divided into separate sections, such as individual panel structures behind each seating assembly 10, and may also include an access opening that extends from the interior compartment 48 to the rear storage compartment 58 (FIG. 1) of the vehicle 40 to allow for the pass through of objects and for accessing the rear storage compartment 58 from the rear row 38 of seating. A bottom portion 60 of the quarter structure 54 is fixably coupled with the floor 26 of the vehicle 40 to form an angle greater than 90 degrees and less than 150 degrees, and more preferably between 100 degrees and 130 degrees. The floor 26 of the vehicle 40 extends forward from the quarter structure 54 beneath the seat bases 14 of the vehicle seating assemblies 42, 44, and further forward therefrom to define footwells 62 in front of each respective seating assembly 42, 44, forming a raised floor area 64 between the footwells 62 for accommodating a tunnel in the substructure of the vehicle 40, which may contain vehicle exhaust lines and a drive shaft. The floor 26 proximate the seat bases 14 of the vehicle seating assemblies 42, 44 provides a lower support that is rigid and stable for securing the seating assemblies 42, 44. Similarly, the back wall 52 provides a rear support 20 for rigidly supporting the seatback 12.

As also shown in FIG. 2, the illustrated embodiment of the back wall 52 includes a recessed area 66 proximate a top portion of each seatback 12 for attaching a head restraint 68 for the respective vehicle seating assembly 42, 44. Below the head restraints 68, a cushioned area 70 is provided that protrudes forward from the quarter structure 54 between inner edges 72 of the seatbacks 12 and between the door openings 46 (FIG. 1) and outer edges 74 of the seatbacks 12. The cushioned area 70 is also provided adjacent to the seat bases 14, protruding upward from the floor 26 between the inner edges 72 of the seat bases 14 and between the door openings 46 and the outer edges 74 of the seat bases 14. The cushioned area 70 has an exterior surface 76 in close proximity to and in general alignment with a back support surface 78 of the seatback 12 in the upright position 36 and a seat support surface 80 of the seat base 14 in a lowered position 82. It is understood that the exterior surface 76 of the cushioned area 70 may be alternatively aligned in additional embodiments with the seatback 12 and the seat base 14 in different positions, recessed away from the seatback 12 or the seat base 14, or not included in other embodiments. The cushioned area 70 may be comprised of various cushioning parts and seating materials, including open-cell or closed-cell foam, flexible polymers, cover stock material, or other conceivable seating and upholstery materials, as generally understood by one having ordinary skill in the art.

The vehicle seating assemblies 42, 44, as illustrated in FIGS. 2-3, are independently actuatable relative to one another, such that the first vehicle seating assembly 42 is shown with the seatback 12 in the reclined position 34 and the corresponding seat base 14 in a raised position 84, while the additional second vehicle seating assembly 44 is shown having the seatback 12 in the upright position 36 and the seat base 14 in the lowered position 82. To effectuate the adjustment between these positions, a slide assembly 86 is coupled between the bottom end 28 of the front link 22 and the floor 26. The slide assembly 86 is positioned to longitudinally displace the bottom end 28 of the front link 22 relative to the floor 26 and other generally fixed portions of the vehicle 40. The seatback 12 moves in conjunction with actuation of the slide assembly 86, such that the seatback 12 also moves relative to the fixed back wall 52 and floor 26 of the vehicle 40, as described in more detail below.

Figure 4:
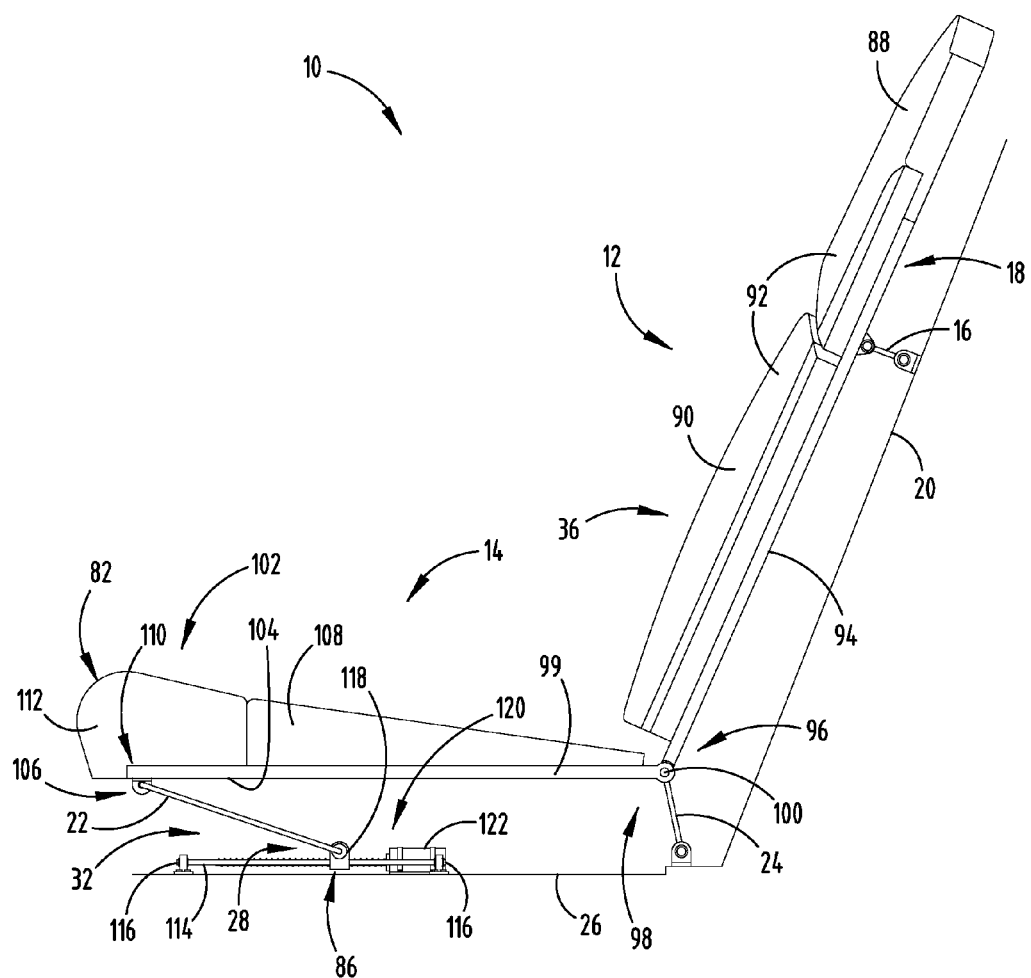
FIG. 4 is a side elevational view of a vehicle seating assembly, according to one embodiment of the present invention.

With reference to FIGS. 2-4, the seatback 12, includes an upper back support section 88 and a lower back support section 90 that each include separate back cushion components 92 coupled with a back support panel 94. The upper and lower back support sections 88, 90 may be further configured in additional embodiments to move independently from one another or may be integrated into a single back cushion. A bottom end 96 of the seatback 12, proximate the bottom of the lower back support section 90, is pivotally coupled with a rearward portion 98 of the seat base 14. More specifically, the back support panel 94 is hingedly coupled with a seat support panel 99 of the seat base 14 about a hinge pin 100 that pivotally connects the support panels. It is understood that various alternative pivotal connections may be configured between the support panels, such as a living hinge or other hinge arrangements, as generally understood by one having ordinary skill in the art.

The seat support panel 99 of the seat base 14, as also illustrated in FIGS. 2-4, is substantially planar and defines a rigid base element for supporting an occupant seated in the vehicle seating assembly 10. A forward portion 102 of the seat base 14 proximate a bottom surface 104 of the seat support panel 99 is pivotally coupled with a top end 106 of the front link 22. The seat and back support panels 94, 99 may conceivably include a central opening with flexible members spanning across the central opening to provide added flexing and resiliency to a seated occupant. A seat cushion 108 is disposed over the seat support panel 99 to substantially conceal the seat support panel 99, while exposing the rearward portion 98 of the seat support panel 99 for pivotally coupling with the back support panel 94 of the seatback 12. The seat cushion 108, as shown in FIG. 4, extends forward over a front end 110 of the seat support panel 99 to define a nose portion 112 of the seat base 14 that is configured to support an occupant's leg rearward the occupant's knee. The seat cushion 108 and the back cushion components 92 may consist of various cushioning parts and seating materials, including open-cell or closed-cell foam, flexible polymers, cover stock material, or other conceivable seating and upholstery materials, as generally understood by one having ordinary skill in the art. It is conceivable that various additional shapes and configurations of the seat base 14 and seatback 12 may be provided in additional embodiments of the present invention.

Figure 5:
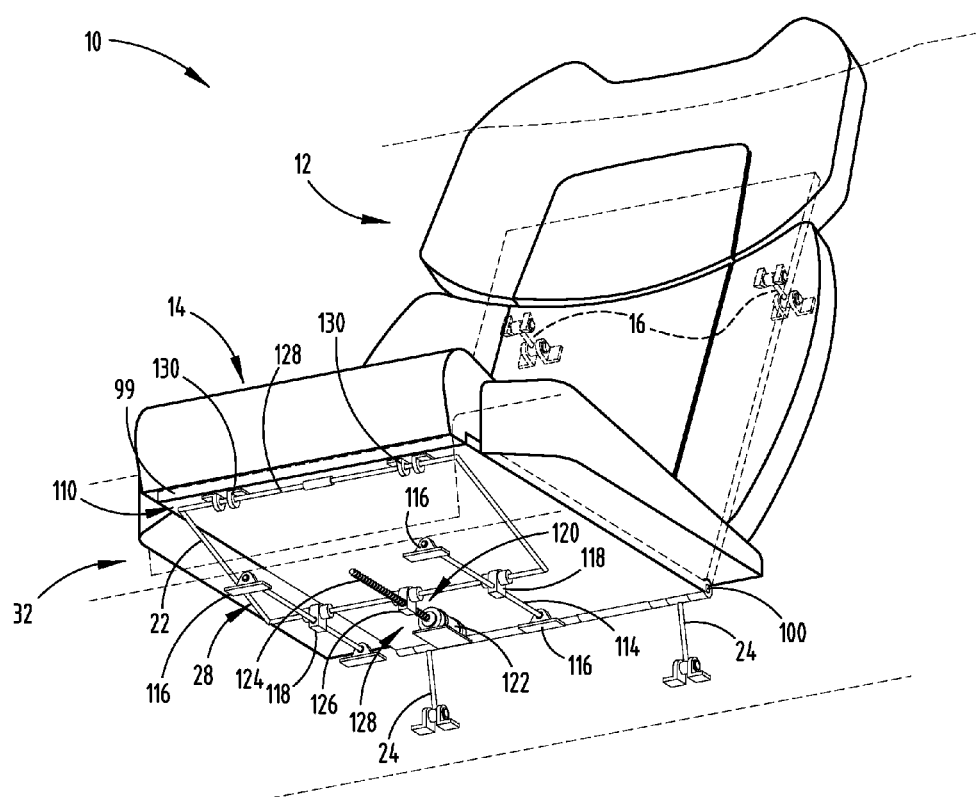
FIG. 5 is a front bottom perspective view of the vehicle seating assembly, showing a floor and other components of the vehicle seating assembly in dashed lines.

Referring now to FIGS. 4-5, the slide assembly 86 coupled between the bottom end 28 of the front link 22 and the floor 26 includes a pair of slide rails 114 longitudinally extending over the surface of the floor 26 and fixedly coupled therewith at opposing ends 116 of the slide rails 114. The slide rails 114 in the illustrated embodiment have a substantially tubular shape with a generally consistent diameter extending between the opposing ends 116. A slide bracket 118 is slidably coupled with each slide rail 114 to permit longitudinal fore and aft movement of the bottom end 28 of the front link 22 relative to the floor 26. The slide bracket 118 is also pivotally coupled with the bottom end 28 of the front link 22 to allow the front link 22 to angularly adjust upon the fore and aft movement on the slide rails 114. An actuator 120 is coupled with the floor 26 centrally between the slide rails 114 and includes an electric motor 122 that has a threaded worm gear 124 extending longitudinally over the floor 26 surface in generally parallel alignment with the slide rails 114. The worm gear 124 is operably interfaced with an adjustment bracket 126 pivotally coupled with the front link 22. It is contemplated that in additional embodiments, the actuator 120 may be alternatively configured with other devices to operably adjust the longitudinal position of the front link 22.

Figure 6A:
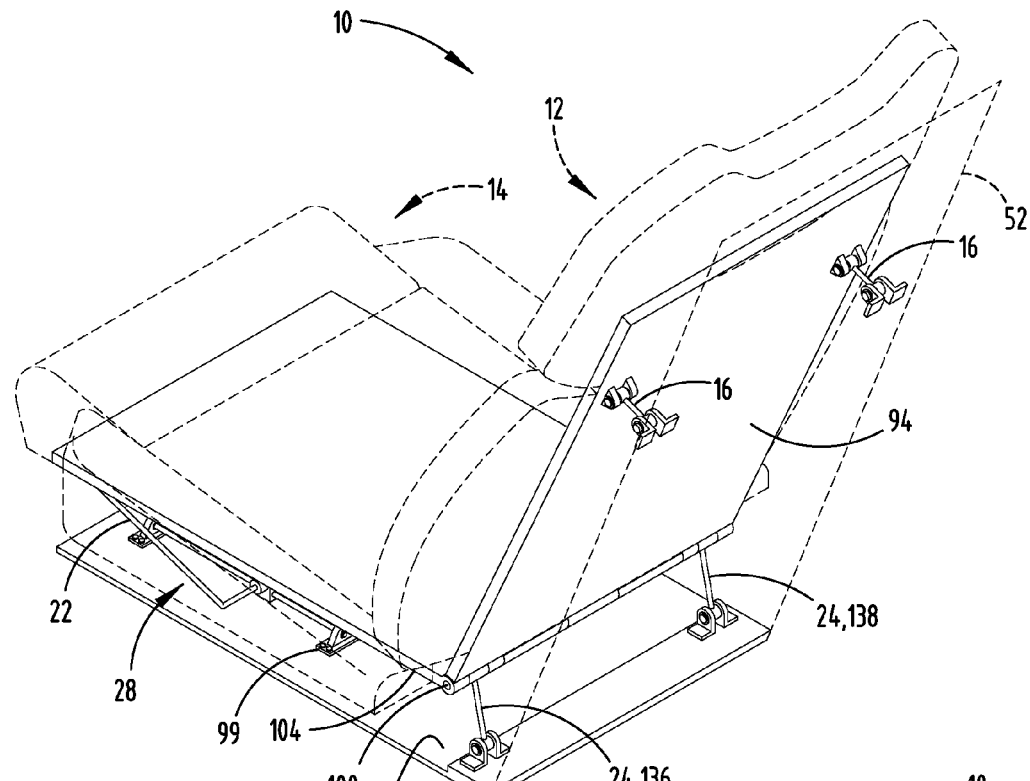
FIG. 6A is a rear top perspective view of the vehicle seating assembly, showing a seat cushion and a back cushion in dashed lines.
Figure 6B:
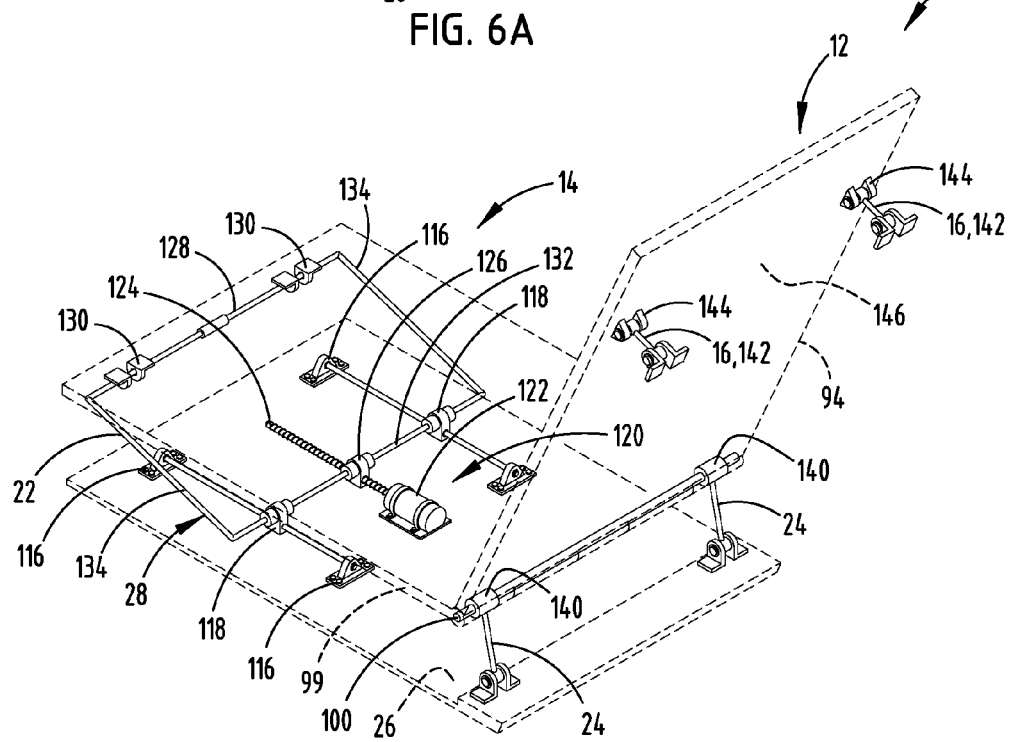
FIG. 6B is a rear top perspective of the vehicle seating assembly, showing the floor, a seat support panel, and a back support panel in dashed lines.

In the illustrated embodiment shown in FIGS. 5-6B, the front link 22 includes a rectangular shape with an upper lateral member 128 extending horizontally beneath the front end 110 of the seat support panel 99 and pivotally coupling with attachment features 130 thereon. A lower lateral member 132 of the front link 22 extends horizontally in parallel alignment with the upper lateral member 128 and pivotally couples with the slide brackets 118 and the adjustment bracket 126, defining a bottom end 28 of the front link 22. Side members 134 of the front link 22 linearly extend between opposing ends 116 of the upper and lower lateral members 128, 132. In additional embodiments, it is contemplated that the side members 134 may include a single member or additional members and may extend between alternative locations on the upper and lower lateral members 128, 132 and may extend at curved or alternatively shaped configurations.

As further shown in FIGS. 6A-6B, the rear link 24 and the upper link 16 are each further defined to include separate members extending between the seating assembly 10 and the floor 26 or the back wall 52. Specifically, the rear link 24 includes first link member 136 and second link member 138 having upper ends pivotally coupled with attachment elements 140 fixedly coupled with the bottom surface 104 of the seat support panel 99 and having lower ends pivotally coupled with the attachment elements 140 fixed to the floor 26 proximate the transition between the floor 26 and the back wall 52. Accordingly, it is conceivable that the lower ends of the rear link 24 may alternatively be pivotally coupled with a lower portion of the back wall 52 to provide similar pivoting movement. Similarly, the upper link 16 includes a pair of link elements 142 pivotally coupled at forward ends with support brackets 144 attached to a rear surface 146 of the back support panel 94 and pivotally coupled at rearward ends with support brackets 144 on the back wall 52. It is contemplated that the rear link 24 or upper link 16 may include a single link member or additional link members, or may also be alternatively configured with other movable couplings, such as with a curved slot arrangement that is slidably engaged with a pin extending from the seating assembly 10 to provide movement along a similar path as provided by the respective rear link 24 or upper link 16, as generally understood by one having ordinary skill in the art.

Figure 7:
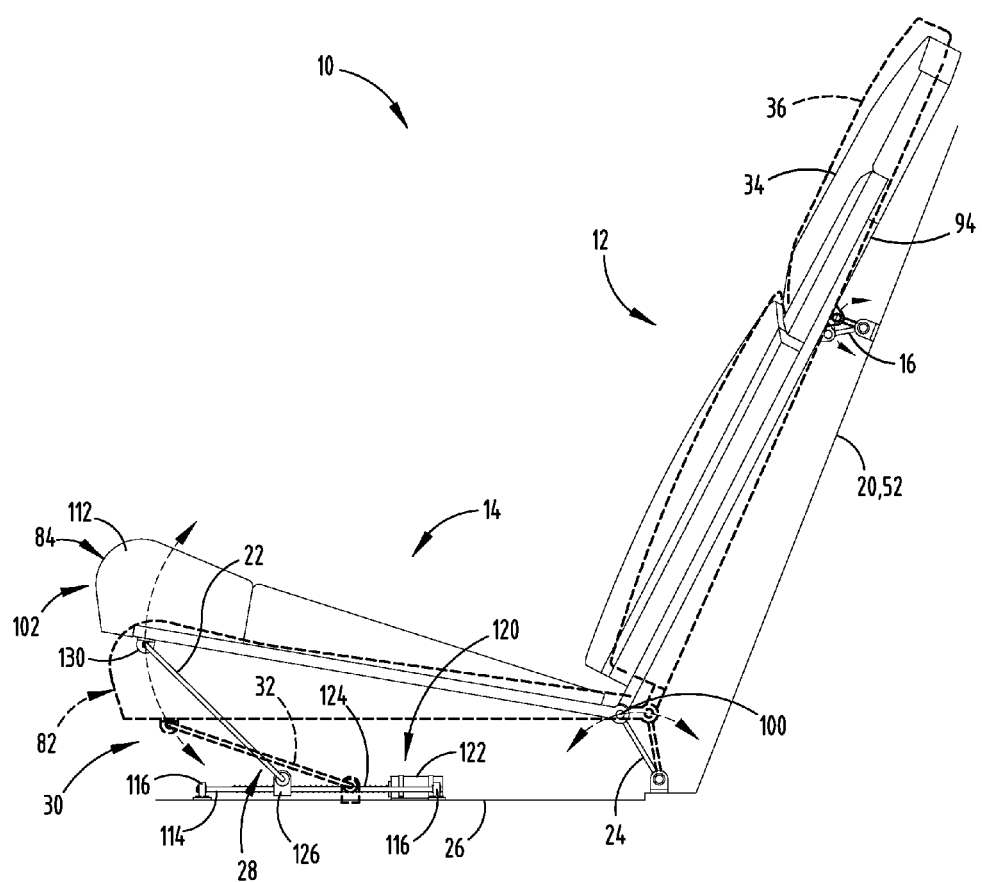
FIG. 7 is a side elevational view of the vehicle seating assembly with the seatback in a reclined position and the seat base in a raised position, and in dashed lines showing the seatback in an upright position and a seat base in a lowered position.

Referring now to FIG. 7, the seatback 12 is moved from the upright position 36, as shown in dashed lines, to the reclined position 34, and the seat base 14 is moved from the lowered position 82, as shown in dashed lines, to the raised position 84. Movement of the bottom end 28 of the front link 22 from the rearward position 32 to the forward position 30 raises the forward portion 102 of the seat base 14 relative to the floor 26. Specifically, rotational actuation of the worm gear 124 (FIG. 6B) by the electric motor 122 moves the adjustment bracket 126 forward on the worm gear 124, and thereby slidably moves the lower lateral member 132 (FIG. 6B) of the front link 22 longitudinally along the slide rails 114. The forward movement of the lower lateral member 132 of the front link 22 on the slide rails 114 and the pivotal and non-sliding connection of the upper lateral member 128 (FIG. 6B) with the seat base 14 causes the front link 22 to angularly adjust to a more inclined position. Also, movement of the bottom end 28 of the front link 22 between the rearward and forward positions 32, 30 adjusts the nose portion 112 of the seat base 14 respectively between the lowered and raised positions 82, 84. As such, the seat base 14 also moves slightly forward when the bottom end 28 of the front link 22 moves from the rearward position 32 to the forward position 30, which thereby draws the seatback 12 down to the reclined position 34. The slight downward and forward movement of the pivotal connection between the seat base 14 and the seatback 12 is exaggerated by the corresponding downward angular movement of the upper link 16, which displaces the seatback 12 downward and reclines to provide a greater angle between the seatback 12 and the floor 26. Movement of the seatback 12 to the reclined position 34 also reduces the space between the back support panel 94 and the back wall 52, and in some embodiments, may cause the back support panel 94 of the seatback 12 to abut the back wall 52 in the reclined position 34.

Figure 8:
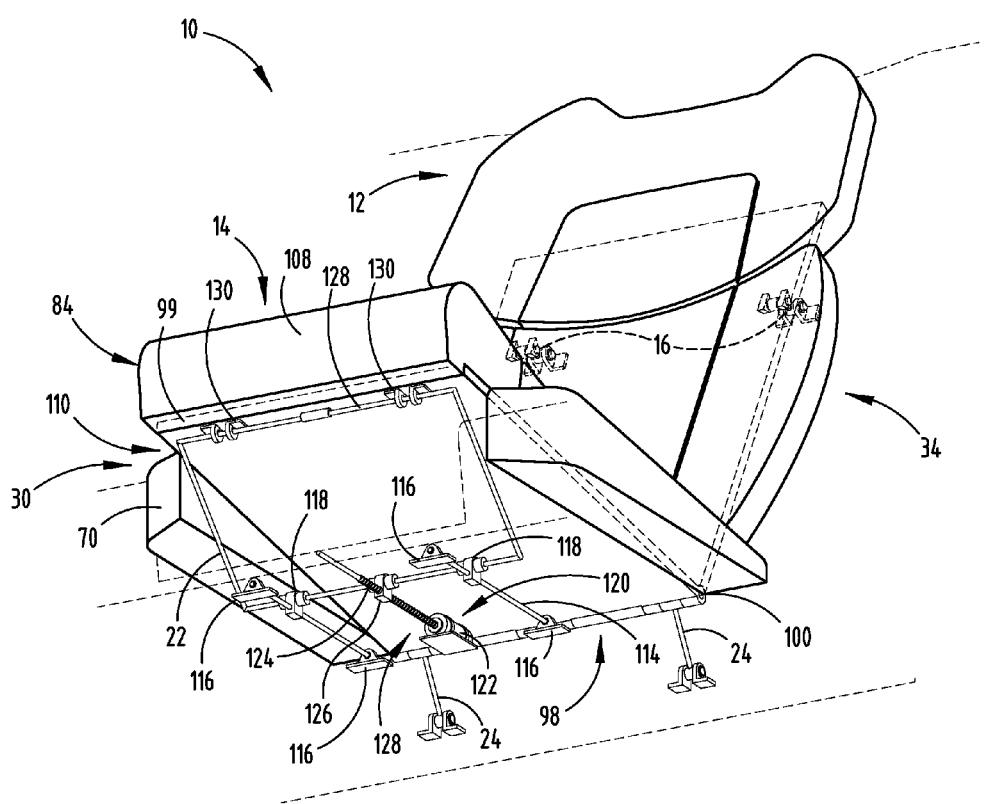
FIG. 8 is a front bottom perspective view of the vehicle seating assembly with the seatback in a reclined position and the seat base in the raised position.
Figure 9A:
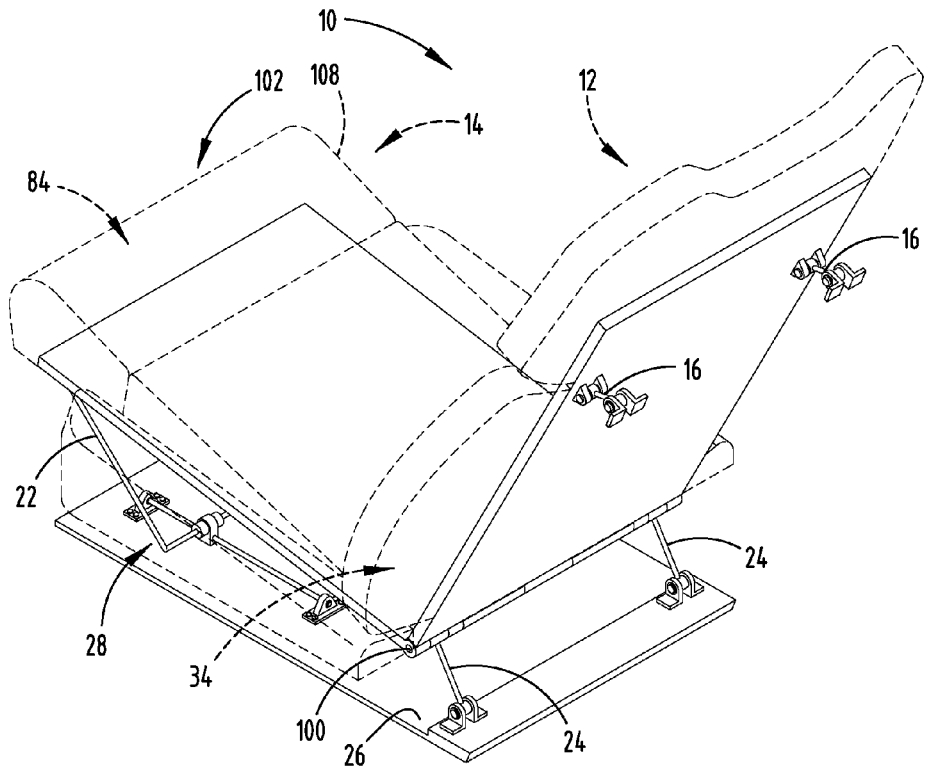
FIG. 9A is a rear top perspective view of the vehicle seating assembly with the seatback in the reclined position and the seat base in the raised position, showing the seat cushion and the back cushion in dashed lines.
Figure 9B:
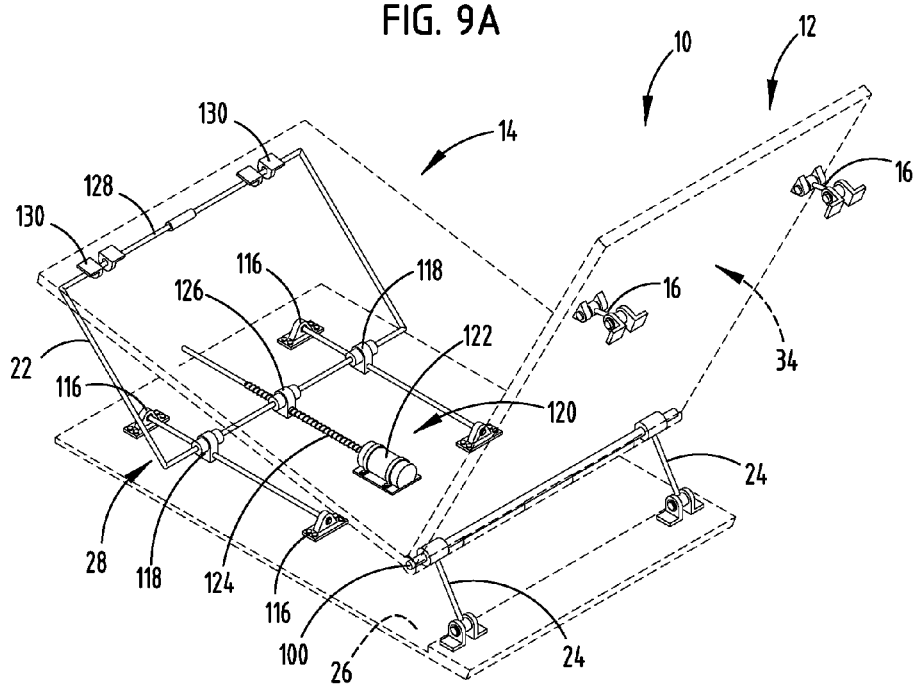
FIG. 9B is a rear top perspective view of the vehicle seating assembly with the seatback in the reclined position and the seat base in the raised position, showing the floor, the seat support panel, and the back support panel in dashed lines.

As shown in FIGS. 8-9B, the seatback 12 is illustrated in the reclined position 34 and the seat base 14 is illustrated in the raised position 84. Accordingly, the worm gear 124 has rotated to move the adjustment bracket 126 forward relative to the floor 26, thereby forcing the front link 22 to reposition to the more inclined angle and to raise the forward portion 102 of the seat base 14 upward to the raised position 84. Raising the seat base 14 forward and upward to the raised position 84 causes the seat cushion 108 to raise above the cushioned area 70 and causes the rearward portion 98 of the seat base 14 to pivot forward and down about the rear link 24. The movement of the rear link 24 down and forward similarly causes the forward end of the upper link 16 to move downward, thereby lowering the seatback 12 to a more reclined angular position. It is contemplated that the steps to move the vehicle seating assembly 10 from the upright position 36 (FIG. 4) to the reclined position 34, and similarly the seat base 14 from the lowered position 82 (FIG. 4) to the raised position 84, as described above, may be reversed to return the seatback 12 to the upright position 36 and the seat base 14 to the lowered position 82.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

We claim:

1. A vehicle seating assembly comprising:
   a seatback;
   a seat base pivotally coupled with the seatback;
   an upper link coupled between the seatback and a rear support; and
   front and rear links coupled between the seat base and a floor, wherein the rear link is shorter than the front link and generally maintains a vertical position of a rearward portion of the seat base and wherein a bottom end of the front link is linearly adjustable on the floor between forward and rearward positions, thereby adjusting a forward portion of the seat base respectively between raised and lowered positions relative to a rearward portion of the seat base.

2. The vehicle seating assembly of claim 1, further comprising:
   a slide assembly coupled between the bottom end of the front link and the floor.

3. The vehicle seating assembly of claim 2, wherein the slide assembly includes an actuator for longitudinally adjusting the bottom end between the forward and rearward position.

4. The vehicle seating assembly of claim 1, wherein a top end of the front link is pivotally coupled with the forward portion of the seat base, and wherein movement of the bottom end of the front link from the rearward position to the forward position raises the forward portion of the seat base relative to the floor.

5. The vehicle seating assembly of claim 1, wherein movement of the bottom end of the front link between the forward and rearward positions adjusts a forward portion of the seat base respectively between the raised position and the lowered position, which correspond with an reclined position and an upright position of the seatback.

6. The vehicle seating assembly of claim 5, wherein the seat base moves forward when the bottom end of the front link moves from the rearward position to the forward position, thereby moving the seatback to the reclined position.

7. The vehicle seating assembly of claim 1, wherein the rear support includes a quarter structure that defines a back wall of a vehicle interior compartment, and wherein the rear support is generally fixed relative to the floor.

8. A vehicle seating assembly comprising:
   a seatback;
   a seat base;
   a coupling between the seatback and a rear support;
   a front link and a rear link shorter in length than the front link pivotally coupling the seat base with a floor, wherein a bottom end of the front link moves along a slide assembly between forward and rearward positions to vertically adjust a forward portion of the seat base relative to a rearward position.

9. The vehicle seating assembly of claim 8, wherein the coupling includes an upper link having a front end pivotally coupled with an upper portion of the seatback and a rear end pivotally coupled with the rear support.

10. The vehicle seating assembly of claim 8, wherein the slide assembly includes an actuator adjacent to the floor for longitudinally adjusting the bottom end of the front link between forward and rearward positions.

11. The vehicle seating assembly of claim 8, wherein a top end of the front link is pivotally coupled with a forward portion of the seat base, and wherein movement of the bottom end of the front link from the forward position to the rearward position lowers the forward portion of the seat base relative to the floor.

12. The vehicle seating assembly of claim 8, wherein movement of the bottom end of the front link between the forward and rearward positions adjusts a forward portion of the seat base respectively between a raised position and a lowered position.

13. The vehicle seating assembly of claim 8, wherein the seat base moves forward when the bottom end of the front link moves from the rearward position to the forward position for moving the seatback to a reclined position.

14. The vehicle seating assembly of claim 8, wherein the rear support includes a quarter structure that defines a back wall of a vehicle interior compartment.

15. A vehicle seating assembly comprising:
- a seatback pivotally coupled with a seat base;
- a first link pivotally coupling the seatback with a rear support;
- a second link pivotally coupling a rear portion of the seat base with a floor; and
- a third link, longer than the first and second links, that pivotally couples the seat base with a slide assembly that moves the third link over the floor, vertically adjusting a front of the seat.

16. The vehicle seating assembly of claim 15, wherein the first is coupled between an upper point on the seatback and the rear support and provides a concave arcuate path of the upper point upon movement of the seatback between the reclined and upright positions.

17. The vehicle seating assembly of claim 15, wherein the second link is coupled between the rear point of the seat base and the floor to provide a concave arcuate path of the rear point upon angular movement of the seat base between a raised position and a lowered position.

18. The vehicle seating assembly of claim 15, wherein the second link defines a rear link having a top end pivotally coupled with the seat base rearward from the third link and a bottom end pivotally coupled with the floor.

19. The vehicle seating assembly of claim 15, wherein the slide assembly includes an actuator that is operable to longitudinally adjust a bottom end of the third link between forward and rearward positions, and wherein movement of the bottom end from the rearward position to the forward position raises a forward portion of the seat base relative to the floor.

20. The vehicle seating assembly of claim 19, wherein the seat base moves forward when the bottom end of the third link moves from the rearward position to the forward position for moving a lower portion of the seatback forward to the reclined position.

\* \* \* \* \*